US008682588B2

(12) United States Patent
Lapierre et al.

(10) Patent No.: US 8,682,588 B2
(45) Date of Patent: *Mar. 25, 2014

(54) METHOD AND APPARATUS FOR GEOBARIC ANALYSIS

(75) Inventors: Scott G. Lapierre, Houston, TX (US); Bruce H. Prine, Sugar Land, TX (US)

(73) Assignee: ConocoPhillips Company, Houston, TX (US)

( * ) Notice: Subject to any disclaimer, the term of this patent is extended or adjusted under 35 U.S.C. 154(b) by 908 days.

This patent is subject to a terminal disclaimer.

(21) Appl. No.: 12/664,356

(22) PCT Filed: Jun. 16, 2008

(86) PCT No.: PCT/US2008/067091
§ 371 (c)(1),
(2), (4) Date: Jun. 30, 2010

(87) PCT Pub. No.: WO2008/157474
PCT Pub. Date: Dec. 24, 2008

(65) Prior Publication Data
US 2010/0268468 A1    Oct. 21, 2010

Related U.S. Application Data

(63) Continuation of application No. 11/764,634, filed on Jun. 18, 2007, now Pat. No. 7,542,853.

(51) Int. Cl.
*G01V 1/40*    (2006.01)

(52) U.S. Cl.
USPC .......................................................... 702/11

(58) Field of Classification Search
USPC ........................................ 702/11; 73/152.51
See application file for complete search history.

(56) References Cited

U.S. PATENT DOCUMENTS

| | | | |
|---|---|---|---|
| 3,517,553 A | | 6/1970 | Williams et al. |
| 3,980,136 A | * | 9/1976 | Plummer et al. ........... 166/280.1 |
| 4,140,343 A | * | 2/1979 | Mills ................................ 299/2 |
| 4,765,182 A | | 8/1988 | Boone |
| 4,833,914 A | | 5/1989 | Rasmus |
| 5,056,595 A | * | 10/1991 | Desbrandes ................... 166/100 |
| 5,789,669 A | * | 8/1998 | Flaum ........................ 73/152.51 |
| 6,061,634 A | * | 5/2000 | Belani et al. .................... 702/12 |
| 6,885,942 B2 | * | 4/2005 | Shray et al. ...................... 702/6 |
| 6,904,365 B2 | * | 6/2005 | Bratton et al. .................... 702/9 |
| 6,950,750 B1 | | 9/2005 | Carpentier |

(Continued)

OTHER PUBLICATIONS

S. Lapierre, Halliburton Energy Services; G. Courville, Kerr-McGee, Oil & Gas Corp; and J. Song, Halliburton, "Achieving Technical Limits: Expanded Application of Real-Time Pressure-While-Drilling Data Helps Optimize ROP and Hole Cleaning in Large-Diameter, Directional Intervals", IADC/SPE 99142 Drilling Conference, Jan. 1, 2006, pp. 1-10, XP007911387.

(Continued)

*Primary Examiner* — Sujoy Kundu
*Assistant Examiner* — Timothy H Hwang
(74) *Attorney, Agent, or Firm* — ConocoPhillips Company

(57) ABSTRACT

A method and apparatus for geobaric analysis. The method may include acquiring an in situ gas volume of a subterranean formation, acquiring a drilling fluid characteristic, determining a volume of gas excavated from the subterranean formation utilizing the drilling fluid characteristic, and estimating the formation pressure utilizing the in situ gas volume and the excavated gas volume.

9 Claims, 6 Drawing Sheets

(56) References Cited

U.S. PATENT DOCUMENTS

| | | |
|---|---|---|
| 7,178,392 B2* | 2/2007 | Dhruva et al. ............. 73/152.51 |
| 7,301,345 B2* | 11/2007 | Chen et al. .................... 324/347 |
| 7,542,853 B2* | 6/2009 | Lapierre et al. ................... 702/6 |
| 2002/0189339 A1* | 12/2002 | Montalvo et al. .......... 73/152.51 |
| 2004/0111216 A1* | 6/2004 | Kneissl et al. .................. 702/12 |
| 2005/0030020 A1 | 2/2005 | Siess et al. |
| 2005/0171699 A1* | 8/2005 | Zazovsky et al. .............. 702/11 |
| 2005/0252286 A1 | 11/2005 | Ibrahim et al. |
| 2006/0037781 A1 | 2/2006 | Leuchtenberg |

OTHER PUBLICATIONS

S.G. Lapierre, B.H. Prine, and H.M. Pickrel, ConocoPhillips Technology for Determining Reservoir Pressure From Mud Log Gas Improves Mature, Tight Gas Asset Performance: A Case Study of Ada Field, North Louisiana, SPE 124315 Proceedings, pp. 1-13,XP007911391.

\* cited by examiner

METHOD AND APPARATUS FOR GEOBARIC ANALYSIS

The application claims priority benefit under 35 U.S.C. Section 119(e) to U.S. Non-Provisional patent application Ser. No. 11/764,634 filed on Jun. 18, 2007 and granted on Jun. 2, 2009 as U.S. Pat. No. 7,542,853.

BACKGROUND OF THE INVENTION

1. Field of the Invention

Embodiments of the present invention relate generally to methods and apparatuses for geobaric analysis. Particularly, various embodiments of the present invention provide methods and apparatuses for estimating a formation pressure from a drilling fluid characteristic.

2. Description of the Related Art

It is often desirable to acquire a formation pressure when drilling into a formation and/or recovering fluids therefrom. For example, if the circulating pressure associated with a drilling fluid is sufficiently higher than the formation pressure, and the formation is permeable enough to receive the drilling fluid, loss may occur and fluids associated with the drilling fluid may flow into the formation. If circulating pressure is sufficiently lower than formation pressure, and the formation is permeable enough to produce fluids, undesirable fluid inflow may occur. To monitor formation pressure, downhole instruments are typically employed for direct measurement. Unfortunately, downhole instruments are time-consuming to operate and often interfere with drilling, thereby preventing formation pressure from being easily monitored while drilling.

SUMMARY

In one embodiment of the present invention, there is provided a method of estimating a formation pressure corresponding to a subterranean formation. The method generally comprises: (a) acquiring an in situ gas volume of the subterranean formation; (b) acquiring a characteristic associated with a drilling fluid returned from the subterranean formation; (c) determining a volume of gas excavated from the subterranean formation utilizing the acquired characteristic; (d) acquiring an excavation pressure; and (e) estimating the formation pressure utilizing the in situ gas volume, the excavation pressure, and the excavated gas volume.

In another embodiment of the present invention, there is provided a computer program for estimating a formation pressure corresponding to a subterranean formation. The computer program comprises code segments operable to: acquire an in situ gas volume of the subterranean formation; acquire a characteristic associated with a drilling fluid returned from the subterranean formation; determine a volume of gas excavated from the subterranean formation utilizing the acquired characteristic; acquire an excavation pressure, and estimate the formation pressure utilizing the in situ gas volume, the excavation pressure, and the excavated gas volume.

In still another embodiment of the present invention, there is provided an apparatus for estimating a formation pressure corresponding to a subterranean formation. The apparatus generally includes a sensing system and a processing system coupled with the sensing system. The sensing system is operable to sense a characteristic associated with a drilling fluid returned from the subterranean formation. The processing system is operable to acquire an in situ gas volume of the subterranean formation and an excavation pressure, determine a volume of gas excavated from the subterranean formation utilizing the sensed characteristic, and estimate the formation pressure utilizing the in situ gas volume, the excavation pressure, and the excavated gas volume.

In yet another embodiment of the present invention, there is provided a method of predicting a volume of gas excavated from a subterranean formation. The method generally comprises: (a) acquiring an in situ gas volume, an excavation pressure, and a formation pressure of the subterranean formation; and (b) predicting the excavated gas volume utilizing the in situ gas volume, excavation pressure, and formation pressure.

In yet another embodiment of the present invention, there is provided a computer program for predicting a volume of gas to be excavated from a subterranean formation. The computer program comprises code segments operable to: acquire an in situ gas volume, an excavation pressure, and a formation pressure of the subterranean formation; and predict the excavated gas volume utilizing the in situ gas volume, excavation pressure, and formation pressure.

In yet another embodiment of the present invention, there is provided a method of determining an in situ gas volume of a subterranean formation. The method generally includes acquiring an excavated gas volume, an excavation pressure, and a formation pressure of the subterranean formation and determining the in situ gas volume utilizing the excavated gas volume, excavation pressure, and formation pressure.

In yet another embodiment of the present invention, there is provided a computer program for determining an in situ gas volume of a subterranean formation. The computer program includes code segments operable to acquire an excavated gas volume, an excavation pressure, and a formation pressure of the subterranean formation and determine the in situ gas volume utilizing the excavated gas volume, excavation pressure, and formation pressure.

In yet another embodiment of the present invention, there is provided a method of performing geobaric analysis of a subterranean formation. The method generally comprises: (a) acquiring a weighting value and at least three of a formation pressure, an excavation pressure, an in situ gas volume, and an excavated gas volume; and (b) utilizing the relationship $$P_{Formation} = P_{Excavation} - \left( \frac{a}{1 - \left( \frac{V_{InSitu} - V_{Excavation}}{V_{InSitu}} \right)} \right),$$

to determine the one of formation pressure, excavation pressure, in situ gas volume, and excavated gas volume not acquired in (a), where $P_{Formation}$ is the formation pressure, $P_{Excavation}$ is the excavation pressure, a is the weighting value, $V_{InSitu}$ is the in situ gas volume, and $V_{Excavated}$ is the excavated gas volume.

In yet another embodiment of the present invention, there is provided a computer program for performing geobaric analysis of a subterranean formation. The computer program includes code segments operable to acquire a weighting value and at least three of a formation pressure, an excavation pressure, an in situ gas volume, and an excavated gas volume and utilize the relationship $$P_{Formation} = P_{Excavation} - \left( \frac{a}{1 - \left( \frac{V_{InSitu} - V_{Excavation}}{V_{InSitu}} \right)} \right);$$

to determine the one of formation pressure, excavation pressure, in situ gas volume, and Formation is the formation pressure, $P_{Excavation}$ is the excavation pressure, a is the weighting value, $V_{InSitu}$ is the in situ gas volume, and $V_{Excavated}$ is the excavated gas volume.

BRIEF DESCRIPTION OF THE DRAWING FIGURES

Embodiments of the present invention are described in detail below with reference to the attached drawing figures, wherein.

DETAILED DESCRIPTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
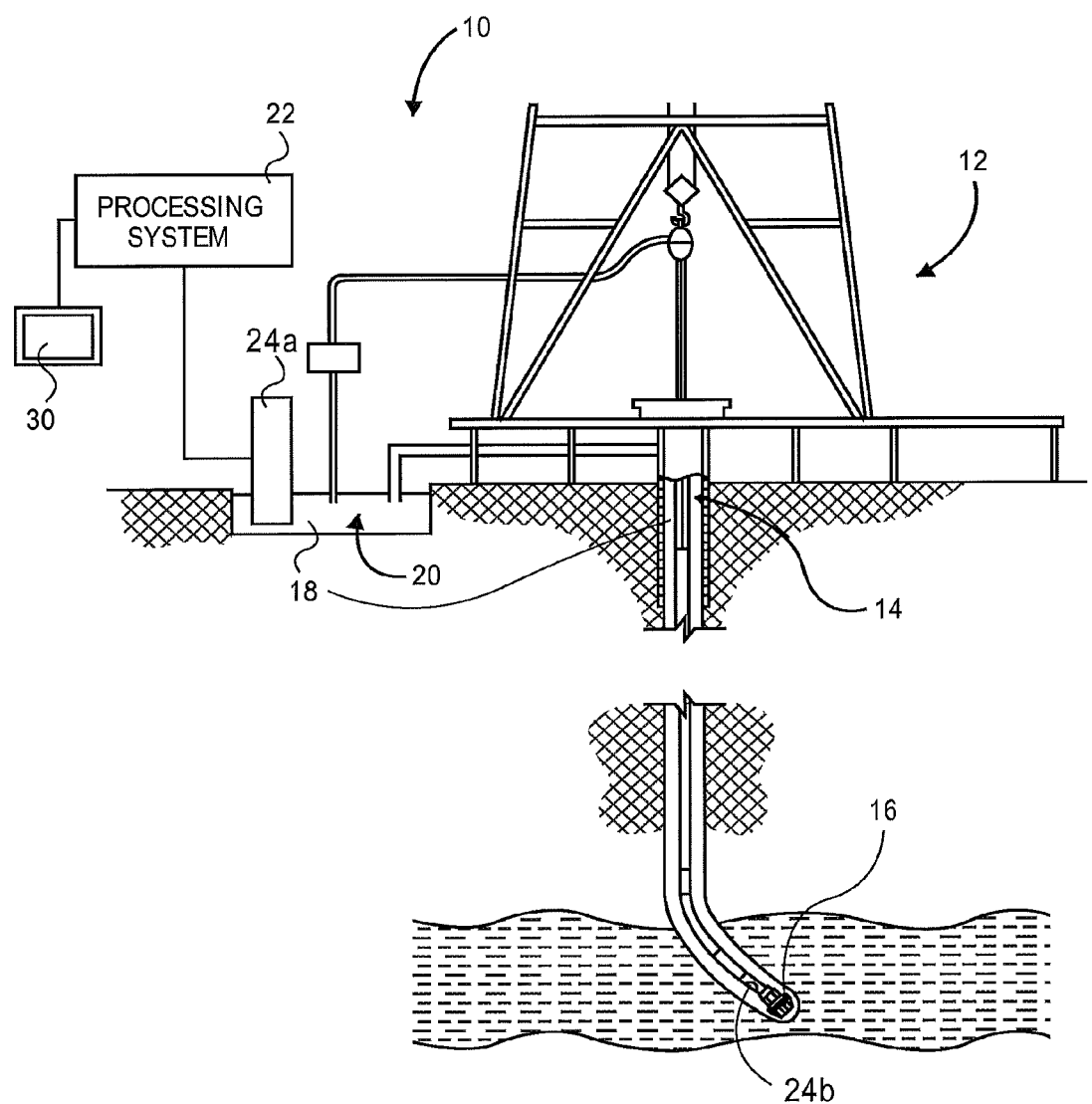
FIG. 1 is an environmental view of drilling operation and associated well, borehole, and drill bit.

Referring initially to FIG. 1, various embodiments of the present invention provide an apparatus 10 operable to estimate a formation pressure corresponding to a subterranean formation by utilizing one or more drilling fluid characteristics. An exemplary well 12, borehole 14, and drill bit 16 are illustrated in FIG. 1. Drilling fluid 18, commonly referred to as "mud," can be pumped from a drilling fluid pit 20 located at or in proximity to the surface above the formation, to the drill bit 16 to maintain a desired hydrostatic pressure in the borehole 14. The drilling fluid 18, now possibly containing cuttings, formation fluids, and/or other borehole fluids, can be returned from the formation to the drilling fluid pit 20 for filtering and recirculation through the borehole 14.

Figure 3:
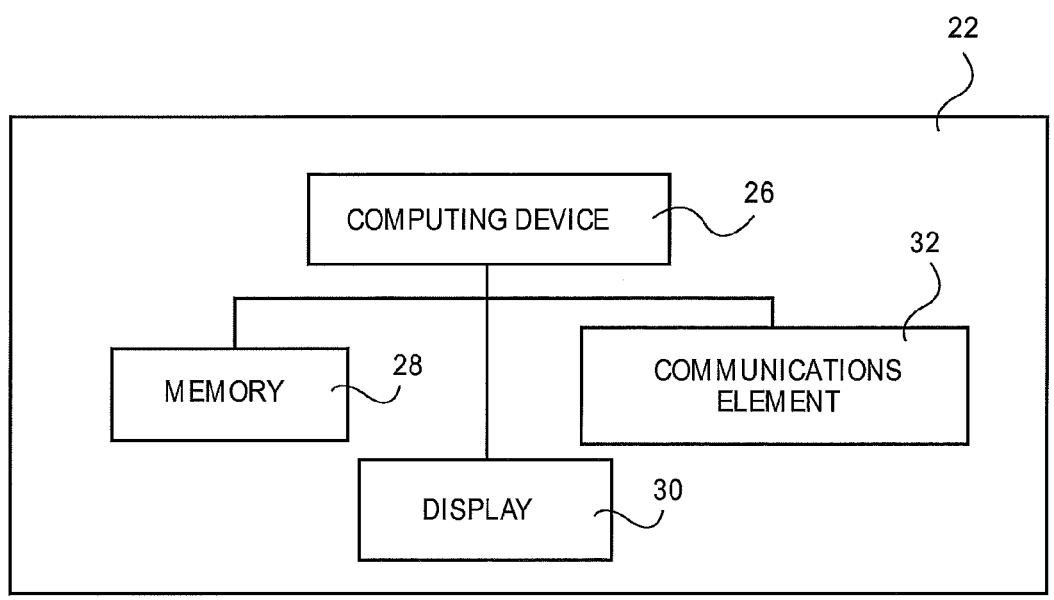
FIG. 3 is a block diagram of some elements of a processing system operable to be utilized by various embodiments of the present invention.
Figure 4:
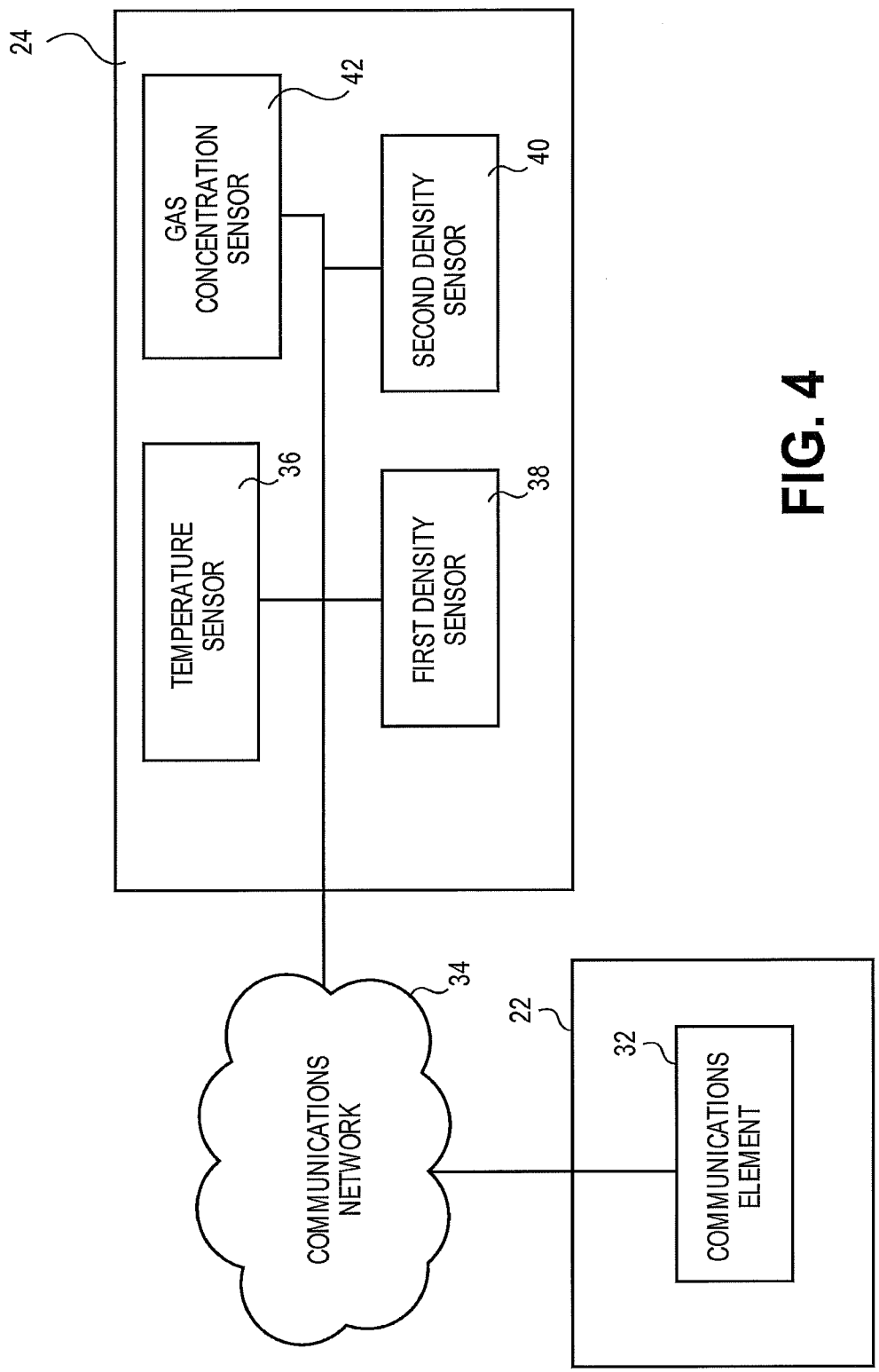
FIG. 4 is a block diagram of some elements of sensing system operable to be utilized by various embodiments of the present invention.

In some embodiments, the apparatus 10 can include a processing system 22 and a sensing system 24 coupled with the processing system 22 operable to sense one or more characteristics of the drilling fluid 18. The processing system 22 can include any element or combination of elements operable to process information provided by the sensing system 24 to estimate the formation pressure. In some embodiments, as illustrated in FIG. 3, the processing system 22 can include a computing device 26, a memory 28, a display 30, and/or a communications element 32. The various processing system elements can be disposed within a single housing or distributed between a plurality of discrete housings in any combination. The processing system elements can be coupled together in any configuration utilizing wired and/or wireless connections.

The computing device 26 can include various analog and digital components operable to perform the various functions discussed herein. In some embodiments, the computing device 26 can include a microprocessor, a microcontroller, a programmable logic device, an application specific integrated circuit, digital and analog logic devices, computing elements such as personal computers, servers, computing networks, portable computing devices, combinations thereof, and the like. Thus, the computing device 26 can comprise a plurality of computing elements in some embodiments.

The memory 28 can be associated with the computing device 26 and include memories of any form or configuration for storing computer programs and information, as is discussed in more detail below. Thus, the memory 28 can comprise a computer-readable medium. In the context of this application, a "computer-readable medium" can be any element or combination of elements that can contain, store, communicate, propagate or transport at least a portion of a computer program for use by or in connection with one or more computing devices such as the computing device 26.

The computer-readable medium can be, for example, but not limited to, an electronic, magnetic, optical, electro-magnetic, infrared, or semi-conductor system, apparatus, device, or propagation medium operable for use by the computing device 26 or other devices. More specific, although not inclusive, examples of the computer-readable medium can include the following: an electrical connection having one or more wires, a portable computer diskette, a random access memory (RAM), a read-only memory (ROM), an erasable, programmable, read-only memory (EPROM or flash memory), an optical fiber, a portable compact disc (CD), a digital video disc (DVD, HD-DVD, Blu-Ray), and an electrical signal representing one or more portions of a computer program. The computer-readable medium could even be paper or another suitable medium upon which a program is printed, as the program can be electronically captured, via for instance, optical scanning of the paper or other medium, then compiled, interpreted, or otherwise processed in a suitable manner, if necessary, and then stored in a computer memory.

The display 30 can be also be associated with the computing device 26 and adapted to display information provided by the computing device 26, such as the formation pressure, to one or more users. The display 30 can include various human-readable display elements, such as cathode-ray tube monitors, liquid crystal displays, a plasma display, a surface-conduction electron-emitter display, a light-emitting diode display, combinations thereof, and the like.

Figure 5:
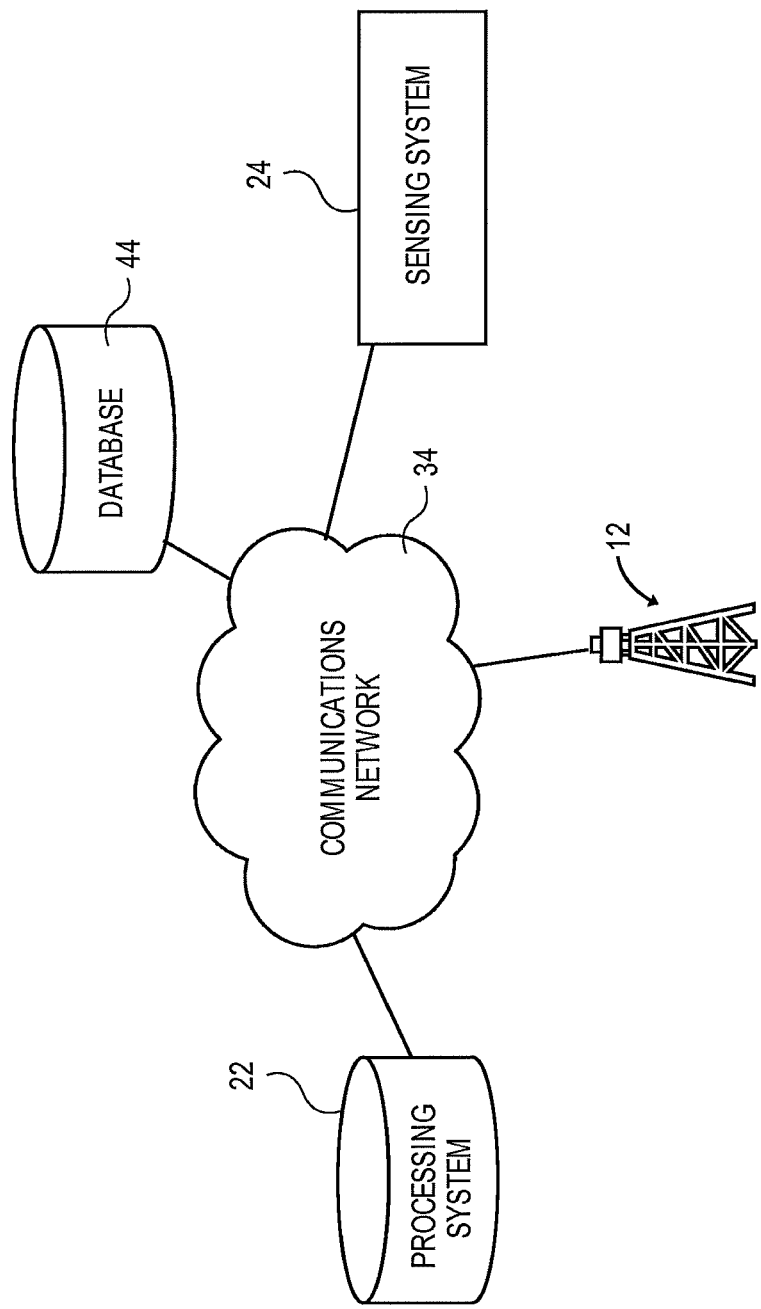
FIG. 5 is a block diagram showing the processing system of FIG. 3 coupled with a communications network.

As shown in FIG. 5, the processing system 22 can utilize the communications element 32 to access a communications network 34 such as an intranet, peer-to-peer network, and/or the internet to exchange information with other devices associated with and/or connected to the communications network 34. The processing system 22 can be operable to access the communications network 34 utilizing wired and/or wireless connections. Additionally or alternatively, the processing system 22 can utilize the communications element 32 to directly access other devices, systems, and elements, such as the well 12 and/or sensing system 24, through wired or wireless connections without relying on the communications network 34. Thus, in some embodiments, the processing system 22 can be positioned remotely from wells and the sensing system 24. Alternatively, the processing system 22 can be integrated with the sensing system 24 for use with a common housing and components.

The sensing system 24 can be adapted to sense one or more characteristics of the drilling fluid 18. In various embodiments, the sensing system 24 is adapted to sense one or more characteristics of the drilling fluid 18 returned from the subterranean formation. Thus, as shown in FIG. 1, the sensing system 24 can be associated with the drilling fluid pit 20 to sense characteristics of the drilling fluid 18 as it is returned to the drilling fluid pit 20. For example, at least a first portion 24a of the sensing system 24 can be disposed within a gas trap associated with the drilling fluid pit 20. However, the sensing system 24 can be associated with any portion of the well 12 to sense drilling fluid 18, well 12, borehole 14, drill bit 16, and/or environmental characteristics, and is not limited to association with the drilling fluid pit 20 and drilling fluid 18. For example, a second portion 24b of the sensing system 24 can be at least partially positioned within the borehole 14 in proximity to the drill bit 16. Other portions of the sensing system 24 can be associated with various fluid lines and pumps connecting the borehole 14 and drilling fluid pit 20. As is discussed in more detail below, the sensing system 24 can additionally or alternatively detect characteristics of the drilling fluid 18 before the drilling fluid 18 is provided or returned to the borehole 14.

The sensing system 24 can be adapted to sense a temperature, density, gas density, pressure, flow rate, and/or any other characteristic of the drilling fluid 18 returned from the formation. In some embodiments, the sensing system 24 can include a temperature sensor 36 operable to sense the temperature of the returned drilling fluid 18, a first density sensor 38 operable to sense the density of the returned drilling fluid 18, and/or a gas concentration sensor 42 operable to sense a concentration of one or more gases, for example $CH_4$, $CO_2$, $N_2$, $H_2$, and the like, present in the returned drilling fluid 18.

The temperature sensor 36 can include any device or combination of devices operable to sense the temperature of the drilling fluid 18 returned from the formation. In some embodiments, the temperature sensor 36 can be at least partially immersed in the drilling fluid 18 to detect its temperature using primary and/or secondary temperature measuring elements. Additionally or alternatively, the temperature sensor 36 can be adapted to sense the temperature of the drilling fluid 18 without physically interacting with the drilling fluid 18. For example, the temperature sensor 36 can employ infrared and other wireless methods to sense or otherwise estimate the temperature of the drilling fluid 18.

The first density sensor 38 can include any device or combination of devices operable to sense the density of the drilling fluid 18 returned from the formation. The first density sensor 38 can be adapted to directly detect the density of the drilling fluid 18 returned from the formation using high energy particle transmissibility, stacked submerged pressure transducers at known separation distances, densitometers, and/or the like.

However, in other embodiments, the first density sensor 38 can be adapted to detect, estimate, and/or estimate the density of the drilling fluid 18 based on the mass and volume, the specific gravity, and/or the temperature of at least portions of the returned drilling fluid 18. For example, the first density sensor 38 can sense a mass of a known volume of the returned drilling fluid 18 and divide the sensed mass by the known volume to produce a density measurement.

The gas concentration sensor 42 can include any device or combination of devices operable to sense the concentration of one or more gases present in the returned drilling fluid 18. In some embodiments, the gas concentration sensor 42 can be adapted to sense the concentration of one or more hydrocarbon gases present within the returned drilling fluid 18. However, the gas concentration sensor 42 can be adapted to sense the concentration of any type of gases within the returned drilling fluid 18. In some embodiments the gas concentration sensor 42 can be a GASWIZARD distributed by Datalog Technology Inc. of Alberta, Canada. Features of gas concentration sensors that can be utilized by embodiments of the present invention are disclosed in U.S. Pat. No. 7,111,503, which is incorporated herein by reference.

The sensing system 24 can additionally include a second density sensor 40 and a second gas concentration sensor adapted to detect the density of the drilling fluid 18 before it is pumped into the formation and the concentration of one or more gases present in the drilling fluid 18 being pumped into the formation. The second gas concentration sensor and second density sensor 40 can be configured in a substantially similar manner as the first density sensor 38 and first gas concentration sensor 42 discussed above but disposed in a manner to enable detection of the density and gas concentrations of the drilling fluid 18 before it is pumped into the formation. Thus, embodiments of the present invention enable any drilling fluid characteristics to be acquired for incoming and outgoing drilling fluid.

The second density sensor 40 can be associated with the drilling fluid pit 20 and/or one or more of the various fluid lines and pumps that connect the drilling fluid pit 20 and the borehole 14. The second density sensor 40 can be discrete from the first density sensor 38 or be integral with the first density sensor 38. In some embodiments, the same sensor can function as both the first density sensor 38 and second density sensor 40.

In various embodiments, the sensing system 24 can be adapted to sense one or more drilling fluid characteristics while the borehole 14 is being drilled. As is discussed in more detail below, by using these real-time measurements, the processing system 22 can estimate formation pressure in real time to allow modification of the drilling fluid 18 in the event of an undesirable change in formation pressure. The sensing system 24, including the second portion 24b of the sensing system 24, can also be adapted to provide various other measurement-while-drilling (MWD) and logging-while-drilling (LWD) functions.

For example, the sensing system 24 can be adapted to measure or acquire depth-based drilling data such as: rate of penetration (ROP); input drilling fluid flow rate (FLOW); bit size; combinations thereof; and the like. The sensing system 24 can also be adapted to measure or acquire other depth-based petrophysical data, such as: water saturation (SW), gas saturation (SG), porosity, mud log total gas (TGAS), formation temperature (TEMP); excavation pressure; known formation pressure for system calibration where available; combinations thereof; and the like. The sensing system 24 can also be adapted to provide gas chromatograph data identifying gas types present in the mud, such as C1, C2, and the like.

The sensing system 24 can be adapted to continuously measure one or more characteristics of the drilling fluid 18, to periodically measure one or more characteristics of the drilling fluid 18, and/or to measure one or more characteristics of the drilling fluid 18 only once. The sensing system 24 can include integral memory and/or processing elements to retain, format, and/or process sensed information in any desired manner. The sensing system 24 can provide sensed information, including sensed drilling fluid 18 characteristics, to the processing system 22 for use in estimating the formation pressure. Further, the sensed characteristics provided to the processing system 22 can represent an average or median sensed characteristic generated over a period of time. For example, the temperature provided by the sensing system 24 to the processing system 22 can represent an average temperature of the returned drilling fluid 18 measured over one minute or any other time period.

Figure 6:
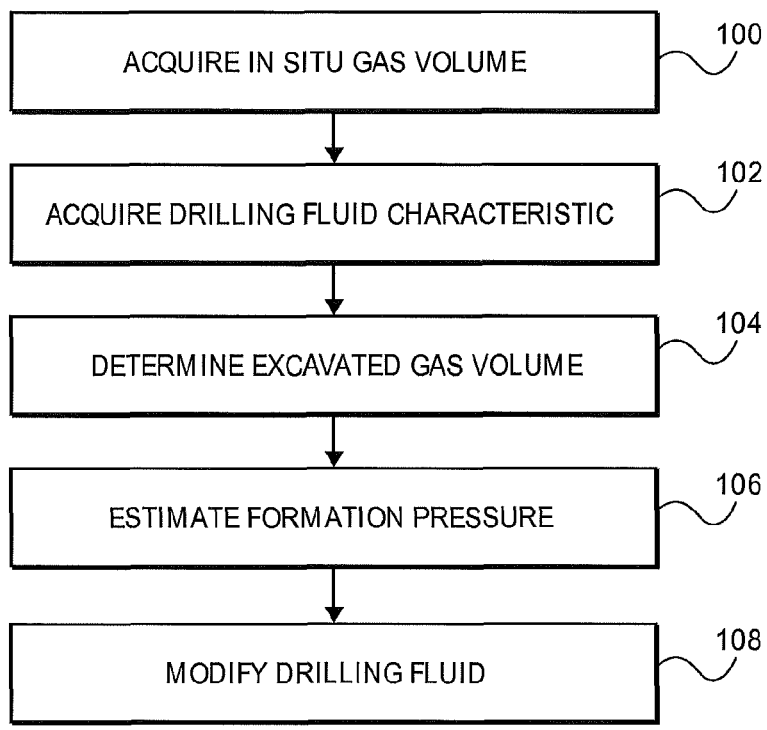
FIG. 6 is a block diagram showing some of the functions operable to be performed by various embodiments of the present invention.

Various functions that can be performed by the apparatus 10 are illustrated in FIG. 6. For example, in some embodiments the apparatus 10 can: acquire an in situ gas volume, referenced at step 100; acquire a drilling fluid characteristic(s), referenced at step 102; determine an excavated gas volume, referenced at step 104; and estimate a formation pressure, referenced at step 106.

Some of the steps illustrated in FIG. 6 can represent one or more code segments comprising at least a portion of a computer program executed by the processing system 22. Steps 100-106 can be performed in any order and are not limited to the specific order described herein. Steps 100-106 can be performed simultaneously or concurrently such that the illustrated steps are not necessarily sequential. Further, steps 100-106 are not each necessarily performed by all embodiments of the present invention.

In step 100, the in situ gas volume is acquired. "In situ gas volume," as utilized herein, refers to the volume of hydrocarbon gases present in the subterranean formation prior to excavation. The processing system 22 can acquire the in situ gas volume by accessing the memory 28, by receiving a user input, by accessing a database 44 through the communications network 34, by performing a computation based on various other acquired data, combinations thereof, and the like.

In some embodiments, the processing system 22 can acquire the in situ gas volume by performing a petrophysical analysis of data acquired by the sensing system 24. For example, the in situ gas volume can be given by—

$$V_{InSitu} = \text{Porosity}(1-SG)HGAL \tag{1},$$

where $V_{InSitu}$ is the in situ gas volume, Porosity is the porosity of the subterranean formation, SG is the gas saturation of the subterranean formation, and HGAL is the volume of the borehole 14 given by—

$$HGAL = \pi \left(\frac{\text{hole\_diameter}^2}{2}\right) L, \tag{2}$$

where L is the length of the borehole 14 and hole_diameter is the diameter of the borehole 14. In some embodiments, gas saturation can be calculated from water saturation (SW) utilizing a gas/oil ratio (GOR).

The processing system 22 can acquire the porosity of the formation, the gas saturation of the formation, the borehole diameter, and/or borehole length from the memory 28, from a user input, through the communication network 34, by interfacing with the drill bit 16 or other well equipment, by receiving data from the sensing system 24, by utilizing conventional mug logging data, combinations thereof, and the like.

In one embodiment, the in situ gas volume can be stored within the memory 28 or distributed through the communications network 34 for later access. In some embodiments, the processing system 22 can create a database of in situ gas volumes for any given gas saturation, porosity, borehole length, and/or borehole diameter combination such that it is not necessary to utilize equations (3) and (4) for every change in borehole or formation conditions.

In step 102, the processing system 22 acquires at least one characteristic of the drilling fluid 18 returned from the subterranean formation. The acquired drilling fluid characteristic can represent any feature or attribute of the drilling fluid 18. In some embodiments, the acquired drilling fluid characteristic can be a temperature of the returned drilling fluid, a density of the returned drilling fluid, and/or a gas concentration of the returned drilling fluid.

The processing system 22 can acquire the returned drilling fluid characteristic from the memory 28, from a user input, through the communication network 34, by interfacing with the drill bit 16 or other well equipment, by utilizing conventional mud logging data, combinations thereof, and the like. In some embodiments, the processing system 22 can acquire the returned drilling fluid characteristic from the sensing system 24. For example, as discussed above, the sensing system 24 can utilize its various sensors, such as the temperature sensor 36, first density sensor 38, and/or gas concentration sensor 42 to sense one or more returned drilling fluid characteristics and the processing system 22 can acquire one or more of the sensed drilling fluid characteristics from the sensing system 24.

As is discussed in more detail below, step 102 can be performed continuously or at periodic intervals to enable real-time monitoring and/or modeling of formation pressure. "Real-time," as utilized herein, refers to the monitoring and/or modeling of information on-site and concurrent with drilling operations and is not limited to instant monitoring and/or modeling of formation pressure. In other embodiments, as is also discussed in more detail below, step 102 can be performed after drilling has ceased to identify the potential of additional hydrocarbon production for one or more wells. For example, step 102 can be performed to determine in situ gas volumes from a drilling fluid characteristic to identify wells that have been erroneously identified as depleted.

In step 104, the excavated gas volume is determined. "Excavated gas volume," as utilized herein, refers to the volume of at least one gas present in the returned drilling fluid 18. The processing system 22 can acquire the excavated gas volume by accessing the memory 28, by receiving a user input, by accessing a database 44 through the communications network 34, by performing a computation based on various other acquired data, combinations thereof, and the like.

In some embodiments, the processing system 22 is operable to determine the excavated gas volume utilizing one or more of the returned drilling fluid characteristics acquired in step 102. Thus, the processing system 22 can estimate and/or calculate the excavated gas volume based upon the density, temperature, gas concentration, and/or other characteristic of the returned drilling fluid 18.

For example, in some embodiments the excavated gas volume can be given by—

$$V_{Excavated} = FGAL \frac{TRUEGAS}{1,000,000}, \tag{3}$$

where $V_{Excavated}$ is the excavated gas volume in gallons per foot, FGAL is a borehole mud volume, and TRUEGAS is given by—

$$TRUEGAS = 1 - \frac{MWOUT - \rho}{MWIN - \rho} \times 1,000,000, \quad (4)$$

where MWOUT is a density of the returned drilling fluid 18, MWIN is a density of the drilling fluid 18 before it is pumped into the subterranean formation, and ρ is a gas density or combination thereof, such as a hydrocarbon gas density, corrected utilizing a present temperature of the returned drilling fluid 18. The 1,000,000 utilized in equations (3) and (4) is a scale factor based on some of the units that can be employed by TRUEGAS and FGAL. As should be appreciated, the scale factor and equations (3) and (4) can be modified to enable the utilization of any units of measurement. For example, where TRUEGAS represents a gas concentration per unit volume of drilling fluid 18, equations (3) and (4) need not employ the scale factor.

The TRUEGAS utilized in equations (3) and (4) can additionally or alternatively be directly acquired with the gas concentration sensor 42 so that it is not necessary to employ the density sensors 38, 40 and temperature sensor 36 in some embodiments. Thus, the excavated gas volume can be directly computed utilizing information provided by the gas concentration sensor 42 and the borehole mud volume discussed above.

In embodiments where the sensing system 24 employs the first gas concentration sensor 42 and the second gas concentration sensor, the processing system 22 and/or sensing system 24 can subtract the gas concentration detected by the second gas concentration sensor from the gas concentration detected by the first gas concentration sensor 42 to ensure that TRUEGAS represents only current formation contribution.

MWOUT and MWIN can be acquired utilizing the first density sensor 38 and second density sensor 40 as discussed above. ρ can be given by—

$$\rho = \frac{P(\text{molecular\_weight})}{RT}, \quad (5)$$

where T is the temperature acquired by the temperature sensor 36, P is a surface pressure acquired using the sensing system 24, molecular_weight is the molecular weight of one or more detected gases that are present in the returned drilling fluid 18 that correspond to the excavated gas volume, and R is the universal gas constant from the Ideal Gas Law. "Surface pressure," as utilized herein, refers the pressure at the surface above the formation, which can be generally assumed to be atmospheric pressure.

The borehole mud volume FGAL utilized in equation (3) can be given by—

$$FGAL = ROP \times FLOW \quad (6),$$

where ROP is the rate of penetration acquired by the sensing system 24 and FLOW is the input drilling fluid flow rate acquired by the sensing system 24. Although the above-equations can utilize English units such as gallons, feet, and the like, it should be appreciated that other units can be employed by utilizing equivalent equations.

In various embodiments, the drilling fluid characteristics and other acquired well and borehole values can be filtered before use in generating the in situ and excavated gas volumes. This is useful to adjust the various input data, which due to the nature of conventional measurements possess independently varying degrees of vertical (depth) resolution, to a common vertical resolution. For example, porosity and gas saturation which are commonly measured by wireline, can possess ½ foot resolution—that is formation properties can be observed to change from ½ foot to the next ½ foot; where as gas data lagged to the surface can be observed to change from 5 feet to the next 5 feet. Thus, depending on the nature of data acquisition system employed by the sensing system 24 and/or the data acquired by the processing system 22, filtering can be used to provide a common vertical resolution of all data. For example, porosity, rate of penetration, mud log total gas, and gas saturation can be filtered using a relative weight based on depth, as is illustrated in the following table.

TABLE 1

| Relative Depth | Relative Weight |
| --- | --- |
| DEPTH – 2 ft | 1 |
| DEPTH – 1 ft | 2 |
| DEPTH | 3 |
| DEPTH + 1 ft | 2 |
| DEPTH + 2 ft | 1 |

As should be appreciated, the various characteristics utilized by embodiments of the present invention can be filtered utilizing various filters such as bell, square, moving, average, combinations thereof, and the like, according to any values based on metric and English depths, locations, and/or positions.

In some embodiments, various characteristics utilized by the processing system 22 can also be depth shifted to provide more accurate formation pressure calculations. For example, mud log total gas (TGAS) or TRUEGAS as acquired by conventional Mud Logging systems represents gas measurements acquired only after an entire volume of drilling fluid has been returned or "lagged" to the surface. These data will typically be on a different depth reference than data acquired by wireline such as porosity and water saturation since they are measured by fundamentally different methods and systems. When compared together they will rarely line up on the same depth perfectly. To reconcile depth misalignment, lagged (circulated to the surface via the annulus) data can be shifted to line up with the wireline-type data. ROP can also be shifted to line up with the appropriate wireline depth.

In some embodiments, the excavated gas volume can be predicted utilizing both the gas concentration sensor 42 and the density and temperature sensors 36, 38, 40. For example, gas concentration measurements provided by the gas concentration sensor 42 can be used to verify and/or calibrate measurements provided by the other sensors 36, 38, 40 and vice versa.

To facilitate the estimation of formation pressure and other formation attributes, the processing system 22 can calibrate TGAS into TRUEGAS. For example, the processing system 22 can plot TGAS as the logarithmic Y-axis and TRUEGAS as the logarithmic X-axis and form a regression equation to produce TRUEGAS for any given TGAS and vice versa. The processing system 22 can discreetly or continuously calibrate TRUEGAS and TGAS based on measurements provided by the sensing system 24. Further, MWOUT can be predicted through calibration of TGAS for comparison with sensed MWOUT values to corroborate calculations. Additionally, MWOUT predicted in this manner also provides a new means for optimization of drilling operations by modeling the effects of penetrating a specific gas-bearing formation with a specific pressure with any rate of penetration and flow. In some embodiments, it is not necessary to calibrate TGAS into TRUEGAS as any corrections provided by the calibration can be achieved through the selection of the weighting value a, discussed in more detail below.

In step 106, the in situ gas volume acquired in step 100 and the excavated gas volume acquired in step 104 are utilized to estimate the formation pressure. In particular, a relationship between a delta gas volume fraction and a delta pressure can be utilized to estimate the formation pressure. The delta pressure can be given by—

$$\Delta P = P_{Excavation} - P_{Formation} \qquad (7),$$

where $\Delta P$ is the delta pressure, $P_{Excavation}$ is the excavation pressure, and $P_{Formation}$ is the formation pressure. "Excavation pressure," as utilized herein means the pressure exerted at the drill bit-formation interface resulting from the combined effects of frictional pressure from circulation; increased density of slurry due to cuttings suspension; and original drilling fluid weight. As discussed below, the sensing system 24 may sense excavation pressure and/or the processing system 22 may independently acquire the excavation pressure.

The delta gas fraction represents a fraction of the excavated gas volume compared to the in situ gas volume. In some embodiments, the delta gas fraction can be given by—

$$\Delta V_{Fraction} = \frac{V_{InSitu} - V_{Excavated}}{V_{InSitu}}, \qquad (8)$$

where $\Delta V_{Fraction}$ is the delta gas fraction, $V_{InSitu}$ is the in situ gas volume, and $V_{Excavated}$ is the excavated gas volume. However, the delta gas fraction can be represented through other representations, including but not limited to:

$$\Delta V_{Fraction} = \frac{V_{Excavated}}{V_{InSitu}}; \qquad (9)$$

$$\Delta V_{Fraction} = \frac{V_{InSitu}}{V_{Excavated}}; \qquad (10)$$

$$\Delta V_{Fraction} = \frac{V_{Excavated} - V_{InSitu}}{V_{Excavated}}. \qquad (11)$$

As $V_{Excavated}$ and $V_{InSitu}$ can represent gas volumes at different pressures, e.g., at the surface and below the surface, the combined gas law can be used to enable the direct comparison of $V_{Excavated}$ and $V_{InSitu}$ at equal condition. Thus, $V_{InSitu}$ can be translated to surface conditions utilizing various measurements made by the sensing system 24 or $V_{Excavated}$ can be translated to bottom hole conditions utilizing various measurements made by the sensing system 24. The processing system 22 can utilize empirical data and other data calculated from measurements made by the sensing system 24 to generate a z-value to correct the combined gas law for non-ideal environments.

Figure 2:
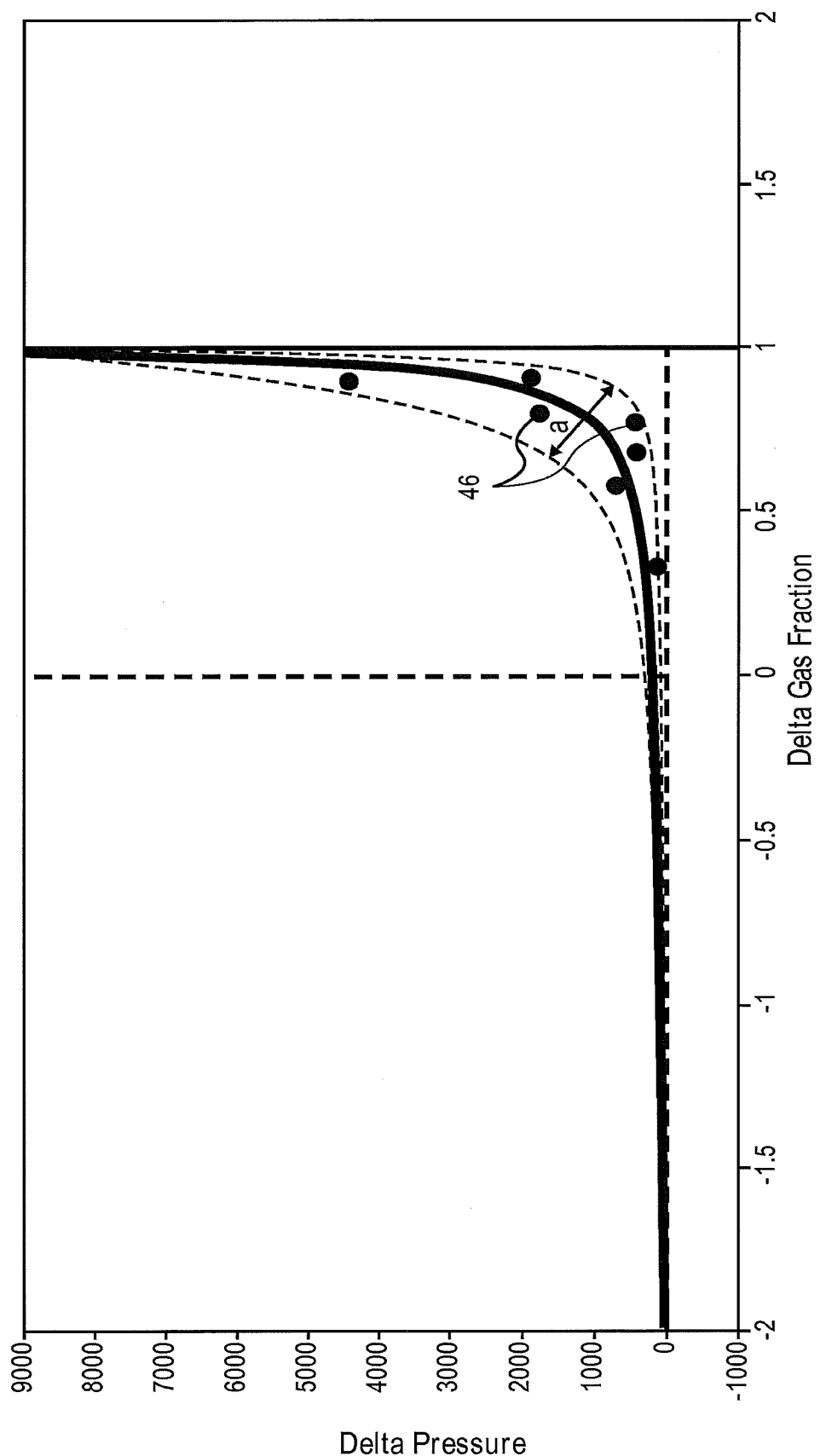
FIG. 2 is a graph showing a curve fitted to a plurality of formation pressure data points.

To identify a relationship between the delta pressure and the delta gas fraction, known delta gas fractions and corresponding delta pressure values can be plotted on a two-dimensional graph and an equation can be fit to the plot to enable formation pressure, or other delta pressure and delta gas fraction components, to be easily determined when known values are not available. For example, as shown in FIG. 2, in embodiments where equations (7) and (8) are utilized, a plurality of known measurements 46 can be plotted, with the delta gas fraction being the x axis and the delta pressure being the y axis, and the processing system 22 can fit an equation to the plotted measurements 46 that provides formation pressure based on in situ and excavated gas volumes.

In embodiments where equations (7) and (8) are used, the following equation can be utilized by the processing system 22 to relate delta pressure (and formation pressure) to delta gas fraction—

$$P_{Formation} = P_{Excavation} - \left(\frac{a}{1 - \Delta V_{fraction}}\right), \qquad (12)$$

where $P_{Formation}$ is the formation pressure, $P_{Excavation}$ is the excavation pressure acquired by the sensing system 24 and/or from other sources, a is a weighting value, and $\Delta V_{Fraction}$ is given by equation (8) above. The weighting value a can be generated by the processing system 22 to best fit the curve given by equation (12) to the plotted measurements 46. In some embodiments, the weighting value a and/or the measurements 46 can be acquired by the processing system 22 from a user input, through the communications network 34, combinations thereof, and the like. Thus, it is not necessary in all embodiments for the processing system 22 to directly generate a utilizing curve fitting functions.

In some embodiments, the sensing system 24 can directly measure the excavation pressure and provide the measurement to the processing system 22. In other embodiments, the processing system 22 can estimate the excavation pressure based on known formation and drilling conditions or utilize a generic excavation pressure selected based on known formation and drilling conditions. The processing system 22 can also acquire the excavation pressure from a user input, through the communications network 34, combinations thereof, and the like.

As should be appreciated by those skilled in the art, the processing system 22 can employ innumerable variations and equivalents of equation (12) to estimate formation pressure or other variables depending on the particular equations utilized to express delta pressure and delta gas fraction. For example, based on the particular combinations of equations (7) through (11) utilized by the processing system 22, delta pressure can be given by—

$$\Delta P = ae^{\frac{bV_{InSitu}}{V_{Excavated}}}, \qquad (13)$$

$$\Delta P = \frac{a}{1 + be^{-c\left(\frac{V_{Excavated}}{V_{InSitu}}\right)}}, \qquad (14)$$

$$\Delta P = \frac{1}{a + b\ln\left(\frac{V_{Excavated}}{V_{InSitu}}\right)}, \qquad (15)$$

$$\Delta P = a + b\left(\frac{V_{Excavated}}{V_{InSitu}}\right) + \frac{c}{\left(\frac{V_{Excavated}}{V_{InSitu}}\right)^2}, \qquad (16)$$

$$\Delta P = a + b\left(\frac{V_{InSitu}}{V_{Excavated}}\right) + c\left(\frac{V_{InSitu}}{V_{Excavated}}\right)^2, \qquad (17)$$

$$\Delta P = ab^{\frac{V_{Excavated}}{V_{InSitu}}}, \qquad (18)$$

where a, b, and c are various weighting values acquired by the processing system 22 from the memory 28, from one or more user inputs, and/or from curve fitting with the plotted measurements 46.

The processing system 22 can employ any one of equations (12) through (18) or any combination of equations (12) through (18) to determine formation pressure and other delta pressure and delta gas fraction attributes. For example, the processing system 22 can estimate a plurality formation pressures utilizing equations (12) through (18) and average the result to identify one formation pressure. Further, as should be appreciated, the processing system 22 can employ innumerable equations to identify formation pressure based on how delta pressure and delta gas fraction are specifically defined.

However, in some embodiments, use of equations similar to equations (12) through (18) can be desirable due to the asymptotic features of the delta pressure/delta gas fraction relationship. For example, as shown in FIG. 2, where equations (7), (8), and (12) are used, a horizontal asymptote is formed at 0, as delta pressure may not be less than zero, and a vertical asymptote is formed at 1, as delta gas fraction may not be more than 1, thereby conveniently bounding the equations that can be utilized to generate formation pressure.

The processing system 22 can estimate the formation pressure in real time as data and information are acquired from the sensing system 24, the memory 28, user inputs, and/or the communications network 34. Thus, any combination of steps 100-106 can be continuously or periodically repeated to provide formation pressure measurements that correspond to the current conditions of the formation and borehole 14.

The estimated formation pressure can be presented on the display 30, stored within the memory 28, and/or distributed through the communications network 34 for use by other devices, systems, and users. In response to the estimated formation pressure and/or pressures, an operator of the well 12 can adjust the characteristics of the drilling fluid 18 to prevent its loss into the formation and undesirable formation fluid inflow into the borehole 14, as is referenced at step 108 in FIG. 6. Based on the estimated formation pressure(s), the operator can also change other drilling characteristics, such as ROP, flow rate, drill string rotary speed, combinations thereof, and the like. Further, based on the estimated formation pressure(s), the operator can change drilling designs, completion designs, and geologic models to more accurately reflect the hydrocarbon-production capabilities of the formation.

Additionally or alternatively, the processing system 22 can estimate formation pressure independently of the time drilling occurred to enable later analysis of the subterranean formation. For example, the processing system 22 can access a database of formation information corresponding to one or more formations to identify untapped hydrocarbon reserves and/or depleted formations. Thus, by data mining previously acquired formation information, the processing system 22 can identify additional hydrocarbon reserves.

Figure 7:
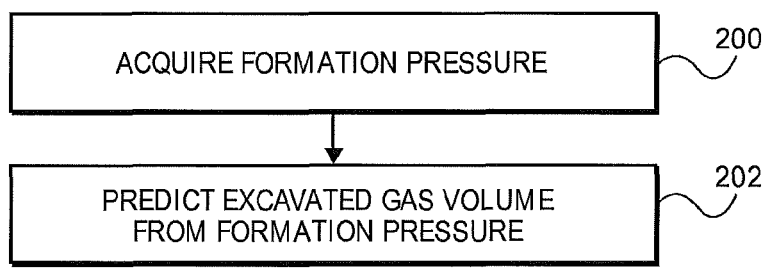
FIG. 7 is a block diagram showing some of the other functions operable to be performed by various embodiments of the present invention.

Various additional or alternative functions that can be performed by the apparatus 10 are illustrated in FIG. 7. For example, in some embodiments the apparatus 10 can: acquire a formation pressure, referenced at step 200; and predict a volume of gas to be excavated from a subterranean formation, referenced at step 202. Some of the steps illustrated in FIG. 7 can represent one or more code segments comprising at least a portion of a computer program executed by the processing system 22. Steps 200-202 can be performed in any order and are not limited to the specific order described herein. Steps 200-202 can be performed simultaneously or concurrently such that the illustrated steps are not necessarily sequential. Further, steps 200-202 are not each necessarily performed by all embodiments of the present invention and steps 200-202 can be performed in combination with steps 100-106 discussed above.

In step 200, the processing system 22 acquires the formation pressure. The formation pressure can be acquired as discussed above in step 106 and/or through other methods, such as by accessing the memory 28, acquiring information through the communications network 34, receiving a user input, combinations thereof, and the like. Although the formation pressure can be acquired in real time as drilling progresses, step 200 can be performed after drilling has ceased to prospect for pre-existing wells that can still be capable of hydrocarbon production. Thus, for example, the processing system 22 can acquire a plurality of formation pressures corresponding to a plurality of wells from the database 44 in step 200.

In step 202, the processing system 22 predicts one or more excavated gas volumes using one or more of the formation pressures acquired in step 200 and various additional information such as the in situ gas volume and the excavation pressure. The relationship between formation pressure and excavated gas volume is given by the various equations discussed in step 106 above. Thus, by utilizing the formation pressure acquired in step 200 and other information, such as excavation pressure, drilling fluid temperature, in situ gas volume, drilling fluid density, and/or the like, acquired from the sensing system 24, the memory 28, and/or the database 44, the processing system 22 can predict the volume of gas to be excavated for any given formation.

The excavated gas volume acquired in step 202 can be utilized to identify the effects of drilling on excavation pressure and other related attributes. For example, the processing system 22 can predict a desired drilling fluid density and/or drilling fluid weight based upon the predicted excavated gas volume. Additionally or alternatively, the processing system 22 and/or a drilling operator can optimize drilling design and operation based on the predicted excavated gas volume. For instance, casing requirements, flow rate, and ROP can be modified to allow proper drilling.

Steps 200-202 can be performed to data mine repositories of formation and reservoir information, such as the database 44. Additionally or alternatively, steps 200-202 can be performed in real time as formation pressure measurements are acquired from a downhole sensor or other instrument.

Figure 8:
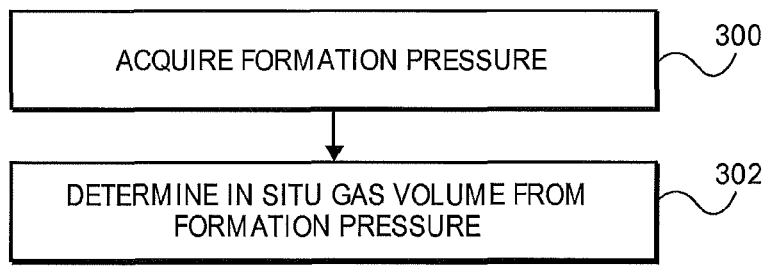
FIG. 8 is a block diagram showing some of the other functions operable to be performed by various embodiments of the present invention.

Various additional or alternative functions that can be performed by the apparatus 10 are illustrated in FIG. 8. For example, in some embodiments the apparatus 10 can: acquire a formation pressure, referenced at step 300; and determine an in situ gas volume based on the formation pressure, referenced at step 302. Some of the steps illustrated in FIG. 8 can represent one or more code segments comprising at least a portion of a computer program executed by the processing system 22. Steps 300-302 can be performed in any order and are not limited to the specific order described herein. Steps 300-302 can be performed simultaneously or concurrently such that the illustrated steps are not necessarily sequential. Further, steps 300-302 are not each necessarily performed by all embodiments of the present invention and steps 300-302 can be performed in combination with steps 100-106 and 200-202 discussed above.

In step 300, the processing system 22 acquires the formation pressure. The formation pressure can be acquired as discussed above in step 106 and/or through other methods, such as by accessing the memory 28, acquiring information through the communications network 34, receiving a user input, combinations thereof, and the like. Although the formation pressure can be acquired in real time as drilling progresses, step 300 can be performed after drilling has ceased to prospect for pre-existing wells that can still be capable of hydrocarbon production. Thus, for example, the processing system 22 can acquire a plurality of formation pressures corresponding to a plurality of wells from the database 44 in step 300.

In step 302, the processing system 22 determines one or more in situ gas volumes using one or more of the formation pressures acquired in step 300 and various additional information such as the excavated gas volume and the excavation pressure. The relationship between formation pressure and in situ gas volume is given by the various equations discussed in step 106 above. Thus, by utilizing the formation pressure acquired in step 300 and other information, such as excavation pressure, excavated gas volume, drilling fluid temperature, drilling fluid density, and/or the like, acquired from the sensing system 24, the memory 28, and/or the database 44, the processing system 22 can determine the in situ gas volume for any given formation.

The processing system 22 can utilize the determined in situ gas volume to determine a gas saturation amount, such as hydrocarbon saturation, to facilitate drilling and exploration. Further, the determined in situ gas volume can be utilized to determine the bulk volume of hydrocarbon within the formation, estimate reserves, refine geologic models corresponding to the formation, change completion designs, and identify bypassed hydrocarbons.

Steps 300-302 can be performed to data mine repositories of formation and reservoir information, such as the database 44. Additionally or alternatively, steps 300-302 can be performed in real time as formation pressure measurements are acquired from a downhole sensor or other instrument.

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term "computer-readable medium" means any element or combination of elements that can contain, store, communicate, propagate or transport at least a portion of a computer program for use by or in connection with one or more computing devices.

As used herein, the term "geobaric analysis" means any analysis that utilizes a relationship corresponding to at least one pressure associated with a subterranean formation.

As used herein, the term "in situ gas volume" means the volume of hydrocarbon gases present in the subterranean formation prior to excavation.

As used herein, the term "excavated gas volume" means the volume of at least one gas present in the returned drilling fluid 18.

As used herein, the term "excavation pressure" means the pressure exerted at the drill bit-formation interface resulting from the combined effects of frictional pressure from circulation; increased density of slurry due to cuttings suspension; and original drilling fluid weight.

As used herein, the term "real-time" means the monitoring and/or modeling of information on-site and concurrent with drilling operations and is not limited to instant monitoring and/or modeling.

As used herein, the term "surface pressure" means the pressure at the surface above the formation, which may be generally assumed to be atmospheric pressure.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of estimating a formation pressure corresponding to a subterranean formation, the method comprising:
   (a) acquiring an in situ gas volume of said subterranean formation;
   (b) acquiring a characteristic associated with a drilling fluid returned from said subterranean formation by means of a sensing system;
   (c) determining a volume of gas excavated from said subterranean formation utilizing said acquired characteristic;
   (d) acquiring an excavation pressure;
   (e) estimating said formation pressure, by a processor, utilizing said in situ gas volume, said excavation pressure, and said excavated gas volume; and
   (f) affecting an aspect of drilling to the subterranean formation based on the estimated formation pressure or exploiting the subterranean formation based on the formation pressure.

2. The method of claim 1, wherein said characteristic includes a temperature, a density, and/or a gas concentration.

3. The method of claim 2, wherein said temperature is acquired using a temperature sensor disposed in proximity to a ground surface above said subterranean formation.

4. The method of claim 2, wherein said density is acquired using a density sensor disposed in proximity to a ground surface above said subterranean formation.

5. The method of claim 2, further including:
   acquiring a density of said drilling fluid before it is pumped into said subterranean formation,
   wherein said estimating of (e) utilizes said density of said drilling fluid before it is pumped into said subterranean formation, said density of said drilling fluid returned from said subterranean formation, and a gas density estimated utilizing said temperature of said returned drilling fluid.

6. The method of claim 5, wherein said excavated gas volume is given by—

$$V_{Excavated} = FGAL \times TRUEGAS,$$

where $V_{Excavated}$ is said excavated gas volume, FGAL is a borehole mud volume, and TRUEGAS is given by—

$$TRUEGAS = 1 - \frac{MWOUT - \rho}{MWIN - \rho},$$

where MWOUT is said density of said drilling fluid returned from said subterranean formation, MWIN is said density of said drilling fluid before it is pumped into said subterranean formation, and $\rho$ is said gas density estimated utilizing said temperature of said returned drilling fluid.

7. The method of claim 1, wherein said formation pressure is given by—

$$P_{Formation} = P_{Excavation} - \left(\frac{a}{1 - \Delta V_{Fraction}}\right),$$

where $P_{Formation}$ is said formation pressure, $P_{Excavation}$ is said excavation pressure, a is a weighting value, and $\Delta V_{Fraction}$ is given by—

$$\Delta V_{Fraction} = \frac{V_{InSitu} - V_{Excavated}}{V_{InSitu}},$$

where $V_{InSitu}$ is said in situ gas volume and $V_{Excavated}$ is said excavated gas volume.

8. The method of claim 1, wherein said excavation pressure is acquired through direct measurement.

9. The method of claim 1, further including modifying said drilling fluid based upon said estimated formation pressure.

* * * * *